3,131,128
ANTI-VIRAL BIGUANIDES

Seymour L. Shapiro, Hastings on Hudson, and Louis Freedman, Bronxville, N.Y., assignors to U.S. Vitamin & Pharmaceutical Corporation, New York, N.Y., a corporation of Delaware
No Drawing. Filed May 24, 1961, Ser. No. 112,187
2 Claims. (Cl. 167—78)

This invention is concerned with $N^1,N^1$-polymethylenebiguanides which are useful antiviral agents especially in influenzal infections.

Although $N^1,N^1$-dimethylbiguanide and $N^1,N^1$-anhydrobis-($\beta$-hydroxyethyl)biguanide hydrochloride have been suggested as useful in the treatment of influenza, considerably better antiviral properties have now been found with biguanides of the formula:

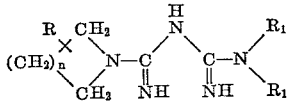

wherein $n$ is an integer ranging from 2–4 and R and $R_1$, alike and different, are hydrogen or methyl.

Since these biguanides are strong bases, in compounding them, for reasons of convenience and stability, they are desirably utilized as their hydrochlorides or other monobasic salts with the non-toxic inorganic and organic acids. Such salts include, for example, the hydrobromide, malate, acetate, and the 8-chlorotheophyllinate. Additional salts can be processed from the hypoglycemic sulfonamides such as $N^1$-(p-methylbenzene)-sulfonyl-$N^1$-n-butylurea.

The preferred compositions are derived from the compound of the following formula:

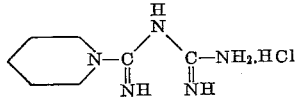

Although this compound has been known in the art, its significant and potent antiviral properties have not, to this point, been recognized or described.

Typifying the novel and useful compositions of this application, which is in no sense limiting, is the example described below.

EXAMPLE 1

*Preparation of compounds.*—The compounds are readily processed by fusion of the appropriate cyclic secondary amine hydrochloride and the appropriately substituted dicyandiamide by procedures indicated in the literature and compositions having as their essential active ingredient include: $N^1,N^1$-tetramethylenebiguanide hydrochloride, $N^1,N^1$ - pentamethylenebiguanide hydrochloride, $N^1,N^1$-(1-methylpentamethylene)biguanide hydrochloride, $N^1,N^1$ - (3 - methylpentamethylene)biguanide hydrochloride, $N^1,N^1$ - hexamethylenebiguanide hydrochloride, $N^1,N^1$-pentamethylene-$N^5$-methylbiguanide hydrochloride, $N^1,N^1$ - tetramethylene - $N^5,N^5$ - dimethylbiguanide hydrochloride.

The preferred compound is $N^1,N^1$-pentamethylene biguanide hydrochloride, M.P. 205–207° (ethanol). In the discussion which follows, this compound is referred to as DBP.

*Screening activity in eggs.*—The PR8 strain of mouse influenza virus was suspended in a nutrient broth (pH 7.0) and diluted by ten-fold dilution method.

The biguanides were screened at the 0.9 mg./0.1 ml. (distilled water, pH 7.0). If toxic to embryonated eggs, the dose was decreased. If no toxicity was manifest, higher doses up to 2.0 mg./0.1 ml. were inspected. As a rule, about ten dozen embryonated eggs were used for each compound.

The virus suspensions were inoculated into the chlorioallantoic cavity of a ten-day old chick embryo, followed immediately by inoculation of the test solution into the same site of the embryo and the eggs so treated, incubated for 24 hours. After refrigeration overnight, the chlorioallantoic fluids were pooled from each embryo and titrated according to the modified Salk pattern method, and the results (Table I) classified as pronounced activity (3+), moderate activity (2+), mild activity (1+), no activity (−), and the mortality rate for the eggs was determined (in percentage).

*Table I*

| DBP, mg./0.1 ml. | Activity | Number of Eggs | Mortality Rate Percent |
|---|---|---|---|
| 0.2 | 1 | 96 | 16 |
| 0.5 | 2 | 360 | 24 |
| 1.0 | 3 | 216 | 32 |
| 1.5 | 3 | 144 | 28 |
| 2.0 | 3 | 72 | 32 |

Comparative tests with $N^1,N^1$-anhydro-bis-($\beta$-hydroxyethyl)biguanide hydrochloride (the biguanide obtained from morpholine) indicated that this compound was very toxic to the embryonated egg, and showed no antiviral activity in this system.

*In vivo testing.*—After establishing that DBP was not lethal to mice when administered every other day at 100 and 150 mg./kg. dosage levels, in vivo studies were conducted as follows:

White male mice (average weight, 20.2 gm.) were divided into two groups of 30 mice each, one treated with DBP, the other serving as control. The strain of mouse influenza virus PR8, kept in embryonated eggs, was adapted to mice by inoculating the virus intranasally. After three passages in mice so infected, they were killed, and their lungs removed, ground with sand, to which 1.0 ml. of Tyrode solution had been added. The lung homogenate was centrifuged for 10 minutes at 1500 r.p.m. and 0.25 ml. of the supernatant so prepared inoculated to all 60 mice, intranasally. The inoculation was made under anesthesia.

The treated group was given DBP (1.0 mg./0.1 ml. per mouse s.c.) on the day of the virus inoculation, and on the third, fifth and seventh days thereafter. This total dose injected had been previously established as not toxic to uninoculaed mice in other tests.

On the tenth day after the virus inoculation, the lungs of mice of both groups remaining alive were removed, their congestion or absence of congestion recorded, and each lung was homogenized separately. The same procedure was used with dead mice. After centrifuging, each supernatant was titrated by the modified Salk pattern test. The mortality, and infectivity data are given below.

Table II
MORTALITY DATA

| Days After Viral Inoculation | Control Group, No. of Mice Dying | DBP Treated Group, No. of Mice Dying |
|---|---|---|
| 3 | 10 | 0 |
| 4 | 5 | 0 |
| 5 | 2 | 2 |
| 6 | 3 | 3 |
| 7 | 1 | 2 |
| 8 | 3 | 2 |
| 9 | 1 | 10 |
| Total | 25 (83%) | 10 (33.3%) |

On inspection, the infectivity rate in the control group was 100% with the dead (25) mice, and living (5) mice on the 10th day after infection, all showing congested lungs, with the infectivity titer of 2+.

In the treated group, of 20 surviving mice on the 10th day after virus inoculation, ten showed a mild lung congestion and a relatively low positive titer (1+), the infectivity being 67%.

It is significant that up to the fifth day, none of the mice in the treated group died, and that of the surviving group, ten had completely thrown off the infection. Moreover, the infected mice were less congested and showed a lower infectivity titer than the control group.

Alternative modes of administration and particularly prophylactic administration of DBP preliminary to the virus inoculation are characterized by even more striking antiviral effects.

For use in the compositions and the method herein disclosed and claimed, we prefer that the biguanide be compounded with an excipient which is non-toxic, edible or potable, solid or liquid and chemically inert to the substituted biguanide salts. The proportion of the excipient should be at least sufficient to separate the particles of the therapeutic agent from each other, and to cause quick solution or dispersion of the resultant composition when contacted with the gastric juice of the stomach. When the excipient is a solid, the amount thereof may be from about 0.3 to about 4 parts for 1 part of the active ingredient. In general, tablets containing 50–200 mg. of active ingredient are preferred.

As solid excipients utilization may be made of lactose, sucrose, starch, pre-gelatinized starch, gum arabic, gum tragacanth and mixtures of these. Suitably, the solid excipient may contain also admixed magnesium stearate, talc, cornstarch, or two or more of these additives to promote separation of the composition from the plunger and mold used in shaping the composition into tablets for use orally.

As an example, and by way of illustration only, the following formulation may be noted:

THERAPEUTIC TABLET

| | Weight in mgs. |
|---|---|
| $N^1,N^1$-pentamethylenebiguanide hydrochloride | 100 |
| Sucrose | 100 |
| Starch | 22 |
| Acacia | 8 |
| Talc | 3 |
| Magnesium stearate | 1.5 |
| Stearic acid | 1.6 |

It will be understood that the biguanide derivatives mentioned above may be used singly or in conjunction with each other and that in the above composition, the $N^1,N^1$-pentamethylenebiguanide hydrochloride may be substituted in whole or in part by any of the other biguanides described and claimed therein.

Other formulations involve nebulizing solutions containing 3–5% of the active ingredient in solution form and injectables containing 1–3% of the active ingredient, preferably as the hydrochloride in aqueous solution or other suitable solvents.

It is to be understood that it is intended to cover all changes and modifications of the examples of this invention herein chosen for the purpose of illustration which do not constitute departures from the spirit and scope of the invention.

We claim:

1. A method for the control of viral infections which comprises administration of a sufficient quantity of a member selected from the group consisting of compounds having the following formula

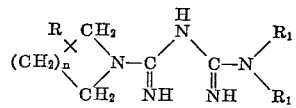

wherein $n$ is an integer ranging from 2 to 4, and R and $R_1$ are selected from the group consisting of hydrogen and methyl, and the pharmaceutically acceptable salts thereof.

2. The method for the control of viral infections which comprises administration of a sufficient quantity of $N^1,N^1$-pentamethylenebiguanide hydrochloride.

References Cited in the file of this patent
UNITED STATES PATENTS
| | | |
|---|---|---|
| 2,534,237 | Cusic | Dec. 19, 1950 |
| 2,999,096 | Schlesinger | Sept. 5, 1961 |

FOREIGN PATENTS
| | | |
|---|---|---|
| 561,630 | Canada | Aug. 12, 1958 |

OTHER REFERENCES
Shapiro: J.A.C.S., vol. 81, pp. 3728–3736, July 20, 1959.

Chem. Abst. (1), vol. 54, p. 21510(b), 1960.

Chem. Abst. (2), vol. 54, p. 1013(g), 1960.